C. W. BALL.
Vehicle-Axle.

No. 220,332.             Patented Oct. 7, 1879.

Witnesses:
W. B. Masson
W. E. Bowen

Inventor:
Charles W. Ball,
by E. E. Masson
atty

UNITED STATES PATENT OFFICE.

CHARLES W. BALL, OF MACON, ILLINOIS.

IMPROVEMENT IN VEHICLE-AXLES.

Specification forming part of Letters Patent No. 220,332, dated October 7, 1879; application filed January 10, 1879.

*To all whom it may concern:*

Be it known that I, CHARLES W. BALL, of Macon, in the county of Macon and State of Illinois, have invented certain new and useful Improvements in Wagon-Axles; and I do hereby declare that the following is a full, clear, and exact description of the same, reference being had to the accompanying drawings, in which—

Figure 1:
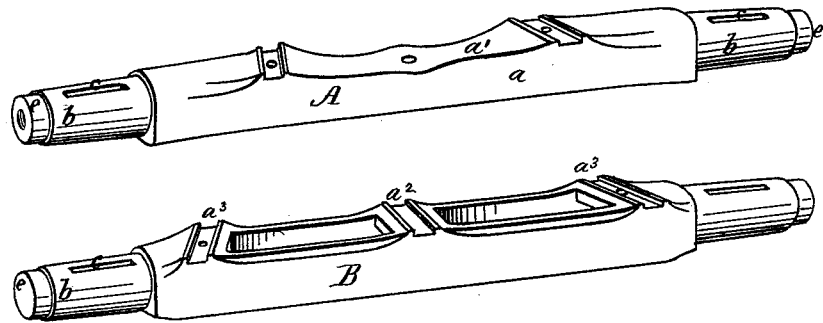
Figure 2:
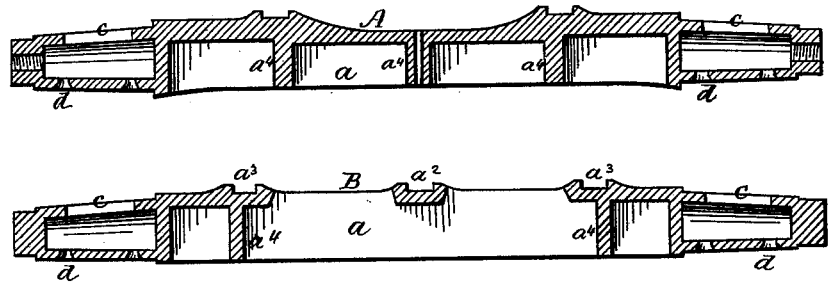
Figure 3:
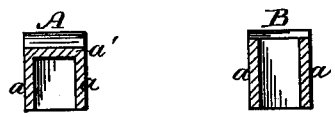

Figure 1 represents, in perspective, a wagon's front and rear axle constructed upon my improved mode. Fig. 2 represents longitudinal vertical sections of the same. Fig. 3 represents transverse vertical sections of the same.

The invention relates to wagon-axles constructed of cast metal.

Heretofore axles of this class have been made either tubular or in the form of T-iron, with a central web and a top plate. The first mode is objectionable for the reason that internal defects, uneven thickness of metal in any part of its length, or any weak spot is thus undetected. The objection to the second is that no central opening can be made in the axle for the reception of bolts, standards, &c.

The object of my invention is to make a uniform, strong, durable, and convenient axle for wagons and other vehicles free from these objectionable features.

My invention consists of cast-steel axles molded and formed in one piece, of two vertical plates forming the sides of the axle, united by short transverse plates, and one or more plates forming the top, the latter having diagonal recesses to receive the hounds.

My invention consists, also, in the combination, in axles molded and formed of cast metal in one piece, of vertical plates forming the sides, united by short transverse plates, and a top plate with hollow lubricating-spindles at the ends of the axles.

In the drawings, A and B represent, respectively, the front and rear axle of a wagon. They are to be made of steel, cast in suitable molds for the purpose. In these axles, $a$ represents the plates forming the sides. They are united in the front axle, A, by a plate, $a^1$, extending the whole length, while in the axle B they are united at each end and at the center, where the plate is grooved transversely at $a^2$ to receive the reach and diagonally at $a^3$ to receive the hounds or side braces. They are also united vertically by short transverse plates $a^3$ to strengthen the whole and prevent vibrating of the sides and their crystallization.

At the ends of the plates $a$, and formed with them at the same casting, are the spindles $b$, forming part of the axle proper. These spindles are hollow to receive and hold the lubricant. They are generally made with an opening, $c$, on top for the introduction of oil or grease, and small perforations $d$ under it for its escape.

The end $e$ of the spindles can be screw-tapped for the reception of a bolt to retain a washer and the wheels in position on the spindles.

The axles, being quadrangular and divided in their length by the plates $a^4$, have thus suitable recesses formed to receive the bolts used in fastening the hounds, braces, standards, and bolster, and also the king-bolt. The recesses adjoining the spindles may also be taken advantage of to contain oil-boxes, or to introduce the lubricant within the hollow spindles without removing the wheels.

Having now fully described my invention, I claim—

1. Cast-steel axles molded and formed in one piece, of two vertical plates forming the sides of the axle, united by short transverse plates, and one or more plates forming the top, provided with diagonal recesses to receive the hounds, substantially as shown and described.

2. The combination, in axles molded and formed of cast metal in one piece, of vertical plates forming the sides, united by short transverse plates, and a top plate with hollow lubricating-spindles at the ends of the axles, substantially as and for the purpose described.

CHARLES W. BALL.

Witnesses:
WM. H. SOWELL,
WM. WOODBURN.